United States Patent
Wang (10) Patent No.: US 6,985,262 B2
(45) Date of Patent: Jan. 10, 2006

(54) METHOD FOR FOUR-COLOR ZERO-MOIRE HALFTONING USING NON-ORTHOGONAL HALFTONE CELLS

(75) Inventor: Shen-Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1078 days.

(21) Appl. No.: 09/905,556

(22) Filed: Jul. 13, 2001

(65) Prior Publication Data

US 2003/0035145 A1 Feb. 20, 2003

(51) Int. Cl.
G06K 15/00 (2006.01)
G06T 5/00 (2006.01)
H04N 1/405 (2006.01)
H04N 1/407 (2006.01)
H04N 1/409 (2006.01)

(52) U.S. Cl. .................... 358/3.26; 358/2.1; 358/3.06; 358/3.09; 358/3.11; 358/3.2

(58) Field of Classification Search ................. 358/1.9, 358/2.1, 3.06, 3.09, 3.11, 3.2, 3.26, 3.3, 536
See application file for complete search history.

(56) References Cited

U.S. PATENT DOCUMENTS

| | | | | |
|---|---|---|---|---|
| 4,185,304 A | * | 1/1980 | Holladay | 358/3.2 |
| 5,323,245 A | * | 6/1994 | Rylander | 358/536 |
| 5,371,612 A | | 12/1994 | Sakamoto | 358/456 |
| 5,883,725 A | * | 3/1999 | Sawano | 358/3.07 |
| 6,226,103 B1 | | 5/2001 | Klassen et al. | 358/1.9 |

* cited by examiner

Primary Examiner—Thomas D. Lee
Assistant Examiner—James A. Thompson (57) ABSTRACT

The invention provides methods for using single-cell non-orthogonal cluster screens to satisfy the moiré-free conditions for four-color halftoning. The selection of these single-cell halftone screens is determined by identifying combinations of four of the halftone cells which satisfy moiré-free conditions provided in the respective frequency equations. Constraints may be applied and the combinations not meeting such constraints can be removed.

18 Claims, 7 Drawing Sheets

METHOD FOR FOUR-COLOR ZERO-MOIRE HALFTONING USING NON-ORTHOGONAL HALFTONE CELLS

BACKGROUND

This invention relates to color printing, and more particularly to a process for eliminating three-color moiré patterns in four-color (CMYK) printing using parallelogram-shaped halftone cells.

With the advent of inexpensive digital color printers, methods and systems of color digital halftoning have become increasingly important. It is well understood that most digital color printers operate in a binary mode, i.e., for each color separation, a corresponding color spot is either printed or not printed at a specified location or pixel. Digital halftoning controls the printing of color spots, where spatially averaging the printed color spots of all the color separations provides the illusion of the required continuous color tones.

The most common halftone technique is screening, which compares the required continuous color tone level of each pixel for each color separation with one of several predetermined threshold levels. The predetermined threshold levels are stored in a halftone screen. If the required color tone level is darker than the threshold halftone level, a color spot is printed at the specified pixel. Otherwise the color spot is not printed. It is understood in the art that the distribution of printed pixels depends on the design of the halftone screen. For cluster halftone screens, all printed pixels are grouped into one or more clusters. If a cluster-halftone screen only generates a single cluster, it is referred to as a single-cell halftone screen or a single-cell halftone dot.

Alternatively, halftone screens may be dual-dot, tri-dot, quad-dot, or the like.

Halftone screens are typically two-dimensional threshold arrays and are relatively small in comparison to the overall image or document to be printed. Therefore, the screening process uses an identical halftone screen repeated for each color separation in a manner similar to tiling. The output of the screening process, using a single-cell halftone dot, includes a binary pattern of multiple small "dots", which are regularly spaced and is determined by the size and the shape of the halftone screen. In other words, the screening output, as a two-dimensionally repeated pattern, possesses two fundamental spatial frequencies, which are completely defined by the geometry of the halftone screen. While halftoning is often described in terms of the halftone dots, it should be appreciated that halftone dots can also posses shapes ranging from rectangles, squares, lines, and the like.

A common problem that arises in digital color halftoning is moiré patterns. Moiré patterns are undesirable interference patterns that occur when two or more color halftone separations are printed over each other. Since color mixing during the printing process is a non-linear process, frequency components other than the fundamental frequencies of the two or more color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequencies, which will be visibly evident as a very pronounced moiré interference pattern in the output. To avoid, for example, two-color moiré patterns due to misalignment, or for other reasons, different halftone screens are commonly used for different color separations, where the fundamental frequencies of the different halftone screens are separated by relatively large angles. Therefore, the frequency difference between any two fundamental frequencies of the different screens will be large enough so that no visibly noticeable moiré patterns are produced. For three-color separations, it is desirable to avoid any two-color moiré as well as any three-color moiré. Three-color moiré, also known as second-order moiré, occurs when thre halftone screens combine together to produce visible, low frequency colored beat patterns.

It is well known that in the traditional printing industry that three halftone screens, which are square in shape and identical, can be placed at 15°, 45° and 75°, respectively, from a point of origin, to provide the classical three-color moiré-free solution. However, for digital halftoning, the freedom to rotate a halftone screen is limited by the raster structure, which defines the position of each pixel.

Obviously, it is desirable to avoid any two-color and three-color moirés in four-color printing. Usually, in selecting different halftone screens for four color separations, there is only one combination of three screens that will exactly align so that no three-color moiré will be produced, that is there is only one combination of three colors among all four that will meet the three-color zero moiré condition. For example, for a CMYK printer, only the cyan-magenta-black combination will be targeted for three-color moiré free condition. The choice of halftone screen for the four color, yellow, has typically relied on satisfying two-color moiré conditions only and do not provide a moiré free solution for all three-color combinations with yellow.

SUMMARY OF THE INVENTION

This invention provides systems and methods that combine single-cell non-orthogonal cluster screens in four-color separations for substantially moiré-free color halftoning.

In various exemplary embodiments, the combination of non-orthogonal single-cell halftone screens is determined by satisfying moiré-free conditions in frequency space for the functions that define the non-orthogonal single cell halftone screens.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF THE PRESENT INVENTION

It is well known that color halftone printers are susceptible to moiré patterns if the halftone dots of a given color separation spatially overlap the halftone dots of another color separation. Therefore, there has been a long-felt need for convenient systems and methods for determining the spatial and angular positioning of the halftone dots necessary to avoid moiré patterns.

It should be appreciated that, according to this invention, a single-cell halftone dot does not necessarily have to be square in shape. In fact, in view of the following teachings according to this invention, it is beneficial to consider a more general single-cell halftone dot shape other than a square, such as, for example, a non-orthogonal parallelogram. It should be further appreciated, however, that a square can be considered to be a subset of the more general class of parallelograms. Therefore, the following discussion regarding exemplary non-orthogonal parallelograms can be equally applied to square or rectangular halftone dots, as desired.

Figure 1:
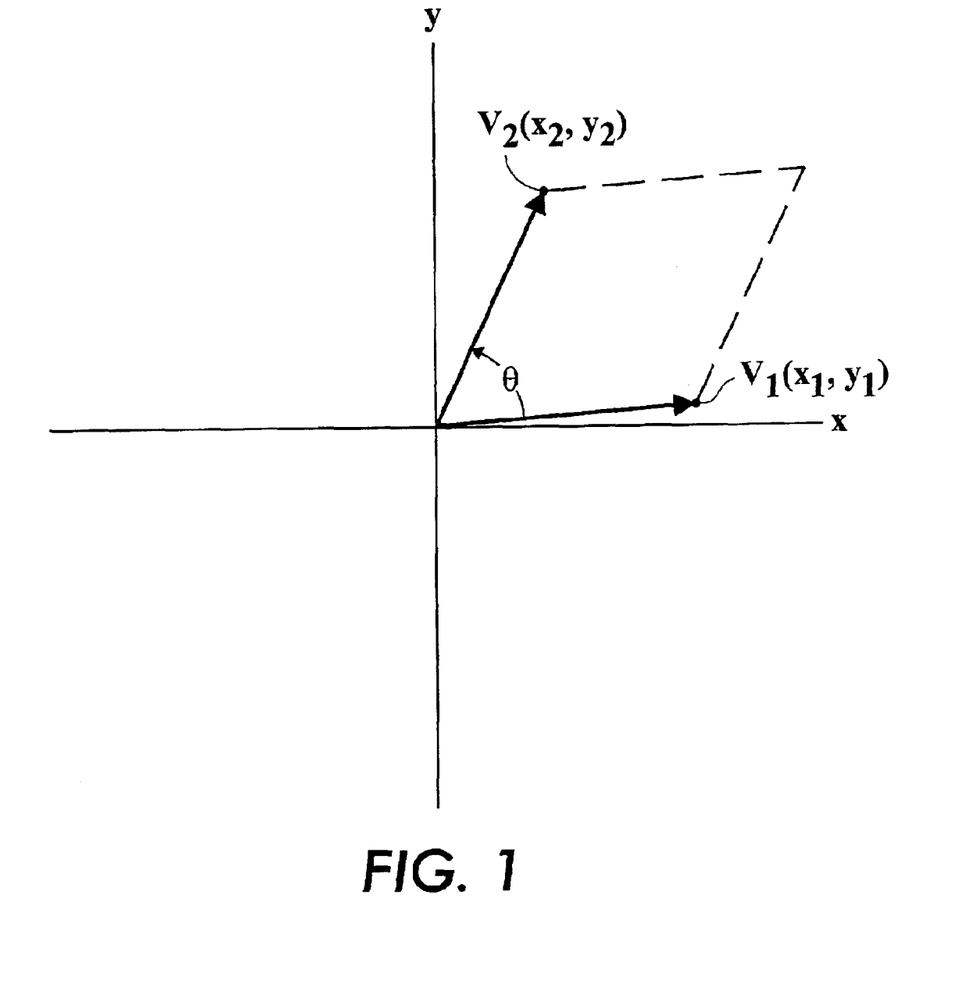
FIG. 1 is a two-dimensional spatial vector representation of a single-cell halftone screen.

To this end, as shown in FIG. 1, a single-cell halftone dot can be an arbitrarily shaped parallelogram and can be represented in the spatial domain by two vectors, $V_1=(x_1, y_1)$ and $V_2=(x_2, y_2)$. Since the specified halftone screen is a single-cell screen, the spatial domain representation is defined by the corresponding raster integer coordinates. In other words, the two spatial vectors $V_1$ and $V_2$ are specified by spatial coordinate values $x_1, y_1, x_2$ and $y_2$. If the given single-cell halftone dot represented by the graph shown in FIG. 1 is used by a halftone screening system, the output will appear as a two-dimensional repeated or "tiled" pattern.

Figure 2:
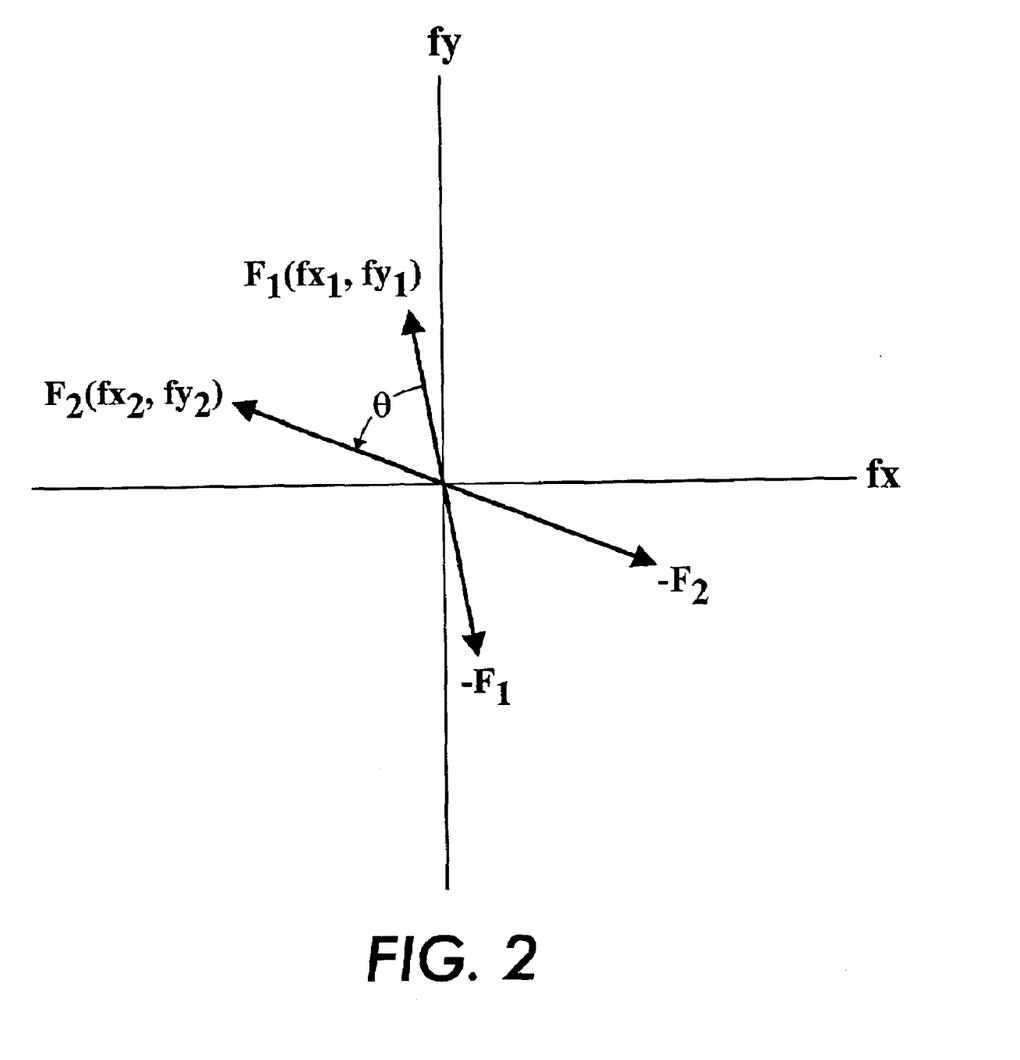
FIG. 2 is a frequency vector representation of the halftone screen of FIG. 1.

It should be appreciated that, by using Fourier analysis, a two-dimensional repeated pattern can be represented in the frequency domain by two frequency vectors, $F_1=(fx_1, fy_1)$ and $F_2=(fx_2, fy_2)$. FIG. 2 illustrates, for example, the two frequency vectors, $F_1$ and $F_2$, corresponding to the Fourier transforms of the two spatial vectors, $V_1$ and $V_2$, respectively. It should also be appreciated that the two frequency vectors $F_1$ and $F_2$ are perpendicular to the two spatial vectors $V_1$ and $V_2$, respectively, and that their moduli are given by:

$$|F_1| = \frac{1}{|V_2 \sin\theta|}, \text{ and} \tag{1a}$$

$$|F_2| = \frac{1}{|V_1 \sin\theta|}; \tag{1b}$$

where θ represents the angle between the vectors $V_1$ and $V_2$, which is also equal to the angle between the frequency vectors $F_1$ and $F_2$. In general, the moduli $|F_1|$ and $|F_2|$ are real numbers.

Also, the area A of the parallelogram encompassed by $V_2$ and $V_1$ can be represented as:

$$A = |V_1 V_2 \sin\theta|. \tag{2a}$$

Alternately, the area A of the parallelogram can be written as a function of the spatial coordinates $x_1, y_1, x_2$ and $y_2$; i.e., as:

$$A = |x_1 y_2 - x_2 y_1|. \tag{2b}$$

Correspondingly, using equations (2a) and (2b), equations (1a) and (1b) can be recast as:

$$|F_1| = \frac{|V_1|}{A}, \text{ and} \tag{3a}$$

$$|F_2| = \frac{|V_2|}{A}. \tag{3b}$$

The vectors $F_1$ and $F_2$ can be decomposed into their scalar components as:

$$fx_1 = \frac{-y_1}{A}, \tag{4a}$$

$$fy_1 = \frac{x_1}{A}, \tag{4b}$$

$$fx_2 = \frac{-y_2}{A}, \text{ and} \tag{4c}$$

$$fy_2 = \frac{x_2}{A}. \tag{4d}$$

Therefore, equations (4a)–(4d) express the frequency-to-spatial-component relationship for a cell defined by the spatial vectors $V_1$ and $V_2$. Although, in general, the frequency components, $fx_1, fy_1, fx_2$, and $fy_2$ are real numbers, they are also rational numbers completely defined by the four integer coordinate values, $x_1, y_1, x_2$ and $y_2$. Since equations (4a)–(4d) describe a corresponding "mapping" of the frequency components to the spatial components, it should be appreciated that any analysis of the moiré-free conditions in the frequency domain can be easily translated into a spatial domain specification. It should be appreciated that, while the above equations are developed in relation to a non-orthogonal single-cell halftone dot having a parallelogram-like shape, it is apparent that the above equations may suitably describe other non-parallelogram shaped dots, for example, squares, rectangles, triangles, ellipses, etc., without departing from the spirit or scope of this invention.

Figure 3:
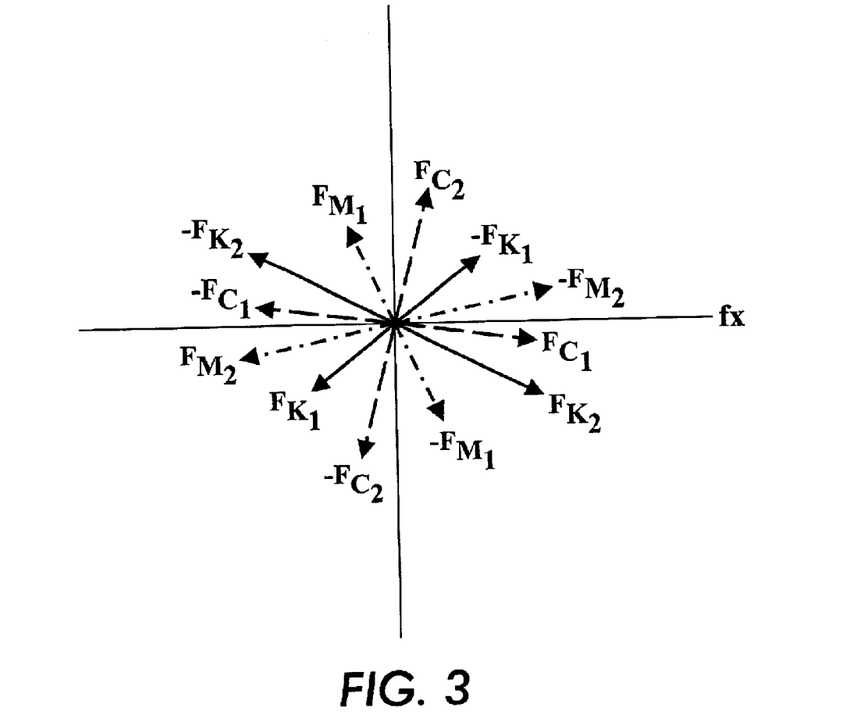
FIG. 3 illustrates a frequency domain representation of three single-cell halftone screens.

To this end, FIG. 3 is an exemplary vector representation in the frequency domain of three parallelogram halftone cells in the spatial domain used in the cyan (c), magenta (m), and black (k) color separations, respectively. As shown in FIGS. 1 and 2, the cyan, magenta, and black parallelogram single-cell halftone screens can be represented by pairs of spatial vectors $V_{C_1}$ and $V_{C_2}$, $V_{M_1}$ and $V_{M_2}$, and $V_{K_1}$ and $V_{K_2}$, respectively, corresponding to the frequency vector pairs $F_{C_1}$ and $F_{C_2}$, $F_{M_1}$ and $F_{M_2}$, and $F_{K_1}$ and $F_{K_2}$, respectively.

From FIG. 3, it is apparent that, to substantially reduce the likelihood of any three-color moiré occurring in any image printed using three single-cell halftone screens, the frequency vectors of the three color separations, for example, cyan, magenta and black, should satisfy the following vector equations:

$$F_{C_1} + F_{M_1} + F_{K_1} = 0, \text{ and} \tag{5a}$$

$$F_{C_2} + F_{M_2} + F_{K_2} = 0 \tag{5b}$$

Figure 4:
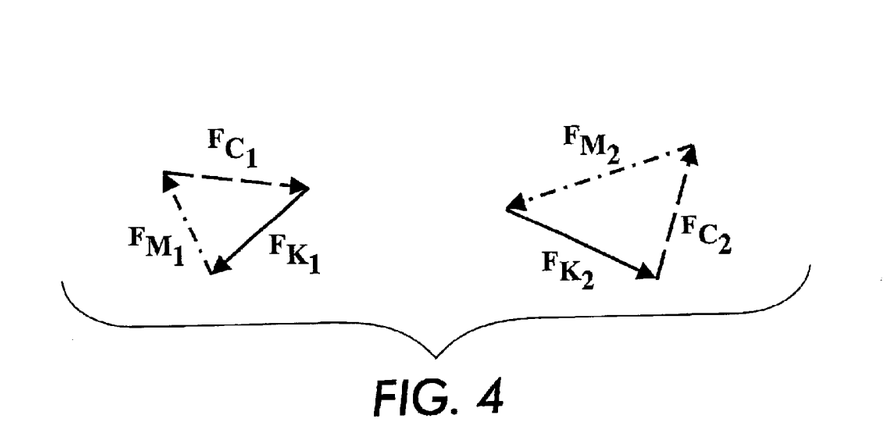
FIG. 4 illustrates an exemplary frequency domain representation of FIG. 3 constrained to satisfy moiré-free conditions.

FIG. 4 is a vector diagram illustrating the exemplary moiré-free vector relationships defined in equations (5a) and (5b). As long as the two frequency vectors for each color are "primary" vectors, which satisfy the following conditions:

$$|F_1 \pm F_2| > |F_1| \text{ and}$$

$$|F_1 \pm F_2| > |F_2|$$

all other CMK combinations, such as $F_{C_1}+F_{M_2}+F_{K_1}$ or $F_{C_1}-F_{M_1}+F_{K_1}$, will yield vectors with spatial frequencies at least equal to or higher than the lowest frequency among the six "primary" vectors involved.

For any frequency vector $F=(f_x, f_y)$ there is always a conjugate vector $F=(-f_x, -f_y)$. Also, the indices 1 and 2 for two frequency vectors of each color can be re-defined. Therefore, we may use equations (5a) & (5b) as the general zero-moiré condition for CMK three-color combination. As demonstrated in co-pending application Ser. No. 09/698,104, filed Oct. 30, 2000, which is hereby incorporated by reference herein, there are many practical solutions satisfying three-color zero-moiré condition using non-orthogonal clusters.

Now, considering four single-cell cluster dots for four-color printing, such as for example CMYK, we have the following eight frequency vectors:

$F_{C_1}=(fx_{C_1}, fy_{C_1})$, $F_{C_2}=(fx_{C_2}, fy_{C_2})$, $F_{M_1}=(fx_{M_1}, fy_{M_1})$, $F_{M_2}=(fx_{M_2}, fy_{M_2})$, $F_{Y_1}=(fx_{Y_1}, fy_{Y_1})$, $F_{Y_2}=(fx_{Y_2}, fy_{Y_2})$, $F_{K_1}=(fx_{K_1}, fy_{K_1})$, $F_{K_2}=(fx_{K_2}, fy_{K_2})$,

Identifying solutions for all combinations of any three colors, we find that some of these solutions are different from each other only in one color. In other words, there is another zero-moiré solution.

$$F_{C_1}+F_{M_2}+F_{Y_1}=0, \text{ and} \qquad (5c)$$

$$F_{C_2}+F_{M_1}+F_{Y_2}=0 \qquad (5d)$$

where $F_{Y_1} \neq F_{K_1}$, $F_{Y_1} \neq F_{K_2}$, $F_{Y_2} \neq F_{K_1}$, and $F_{Y_2} \neq F_{K_2}$.

Since the sign and the index of each frequency vector are defined arbitrarily, we may consider equations (5a), (5b), and (5d), (5c) as general descriptions for two simultaneously three-color zero-moiré conditions for four or more colors. It should be appreciated that this example can apply to any four colors in four-color printing.

For any three-color combinations other than those satisfying equations (5a)–(5d), the results have two possibilities:
1. The summation of three vectors has a spatial frequency at least equal to or higher than the lowest frequency of all "primary" vectors, for example, $$F_{M_1}-F_{Y_1}+F_{K_1}=F_{M_2}$$

which is not the moiré of concern, since the result which equals one of the primary vectors will be much higher than the acceptable moiré constraint described below.
2. The summation of three vectors is the same as one of the C and M combinations, for example, $$F_{M_1}+F_{Y_1}+F_{K_1}=-2F_{C_1}+F_{M_2}$$

In addition, under conditions given by equations (5a)–(5d), any two-color combination should satisfy the minimal two-color moiré constraint:

$$|F_{n_x} \pm F_{m_y}| > M$$

where,

M=minimum acceptable two-color moiré frequency n=a, b, c, d m=a, b, c, d n≠m x=1, 2, and y=1, 2.

The minimal two-color moiré constraint M can depend on the type of printing system used and can be any desired frequency. An example of M, which should not be considered limiting, is 50 lines per inch, although M may be any suitable number depending on the viewing condition. Therefore, combinations of four halftone screens described by frequency vectors which simultaneously satisfy equations (5a)–(5d) and which satisfy the minimal two-color moiré constraint will provide substantially moiré-free four-color printing.

Figure 5:
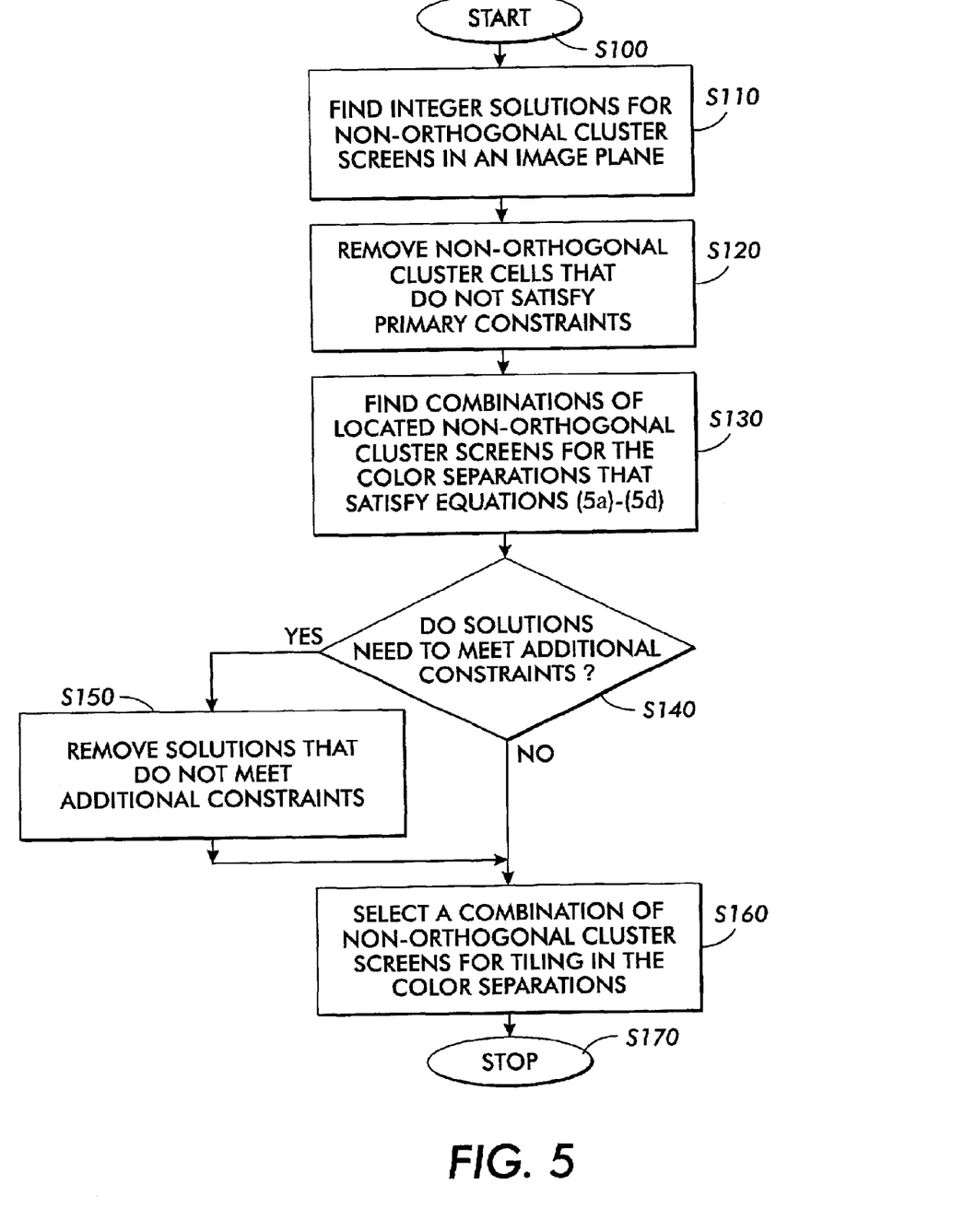
FIG. 5 is a flowchart outlining one exemplary embodiment of a method for determining a combination of non-orthogonal single-cell halftone screens for providing at least substantially moiré-free color halftoning in accordance with the invention.

For, example, FIG. 5 is a flowchart outlining the first exemplary embodiment of a process, according to this invention, for determining a set of non-orthogonal halftone cluster screens for four-color separations to perform substantially moiré-free color halftone printing. Beginning in step S100, control proceeds to step S110, where all non-orthogonal halftone cluster cells having integer values for $x_1$, $y_1$, $x_2$ and $y_2$ are found. Then, in step S120, those non-orthogonal halftone cluster cells found in step S110 that do not satisfy one or more primary constraints, such as, for example, having an area that is smaller than a specified maximal area, $A_{max}$, are removed from the solutions set. Next, in step S130 combinations four-color non-orthogonal halftone cluster screens simultaneously satisfying equations (5a)–(5d) are identified. Control then continues to step S140.

In step S140, a determination is made whether any additional constraints are to be applied. Such additional constraints can contain, for example, frequency ranges, additional color moiré constraints such as the minimal two-color moiré constraint described above, printer limitations, etc. If no additional constraints are identified, the control jumps to step S160. Otherwise, if the identified combinations are required to meet at least one additional constraint, the control continues to step S150 where those identified combinations of non-orthogonal halftone cluster cells that do not meet the additional constraints are removed from the identified combinations of non-orthogonal halftone cluster cells.

In step S160 one of the remaining combinations of non-orthogonal halftone cluster cells is selected and each of the various non-orthogonal halftone cluster cells of the selected combination are associated with one of the various color separations. The combination selected may fulfill additional constraints or may include the best characteristics for a desired appearance, such as for example, the combination providing four screens having spatial frequencies within a specified range. The method then ends in step S170.

Figure 6:
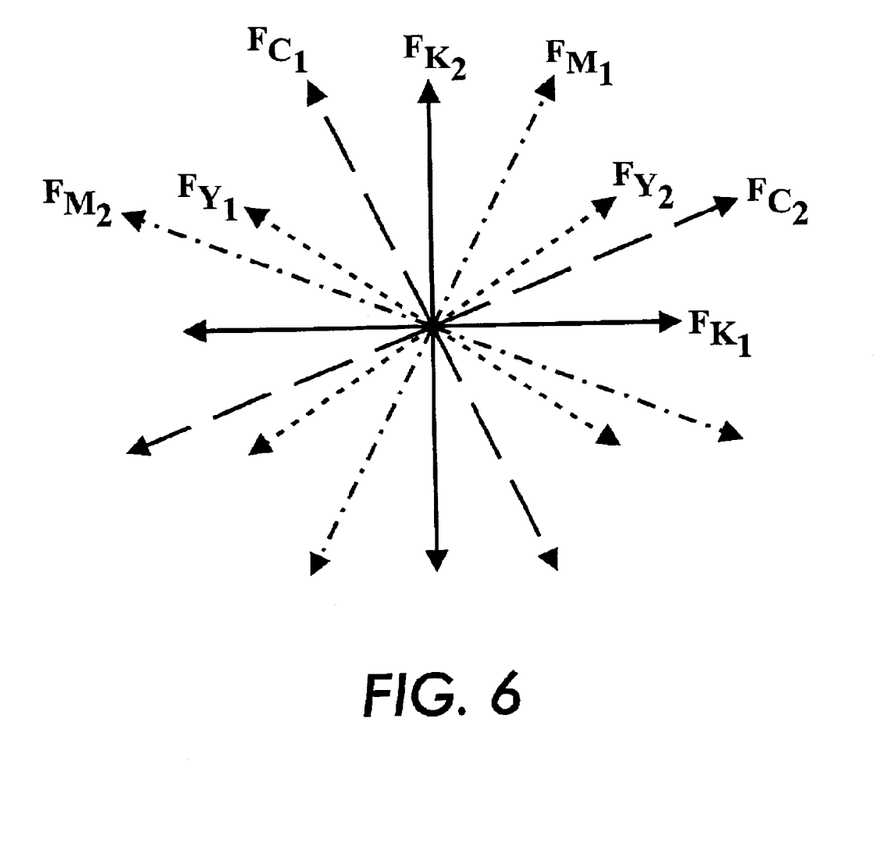
FIG. 6 illustrates the frequency-vector representation of the substantially moiré-free four-color single-cell halftone screens found in accordance with the invention.

One example of such a four-color zero-moiré solution found in accordance with the invention for a 1200-dpi printer is shown in FIG. 6 and is detailed as follows:

| Cyan: | $V_{C_1} = (-2, 4)$, | $V_{C_2} = (5, 2)$, | $F_{C_1}$: −63°, 223 lpi | $F_{C_2}$: 22°, 269 lpi |
|---|---|---|---|---|
| Magenta: | $V_{M_1} = (2, 4)$, | $V_{M_2} = (-5, 2)$, | $F_{M_1}$: 63°, 223 lpi | $F_{M_2}$: −22°, 269 lpi |
| Yellow: | $V_{Y_1} = (-6, 4)$, | $V_{Y_2} = (6, 4)$, | $F_{Y_1}$: −34°, 180 lpi | $F_{Y_2}$: 34°, 180 lpi |
| Black: | $V_{K_1} = (6, 0)$, | $V_{K_2} = (0, 6)$, | $F_{K_1}$: 0°, 200 lpi | $F_{K_2}$: 90°, 200 lpi |

It is not difficult to check that any frequency-vector combinations, including two-color, three-color and four-color ones, from above set of halftone screens, are either zero or larger than 100 lpi. Consequently, the substantially moiré-free halftone screens formed from non-orthogonal cluster cells can be used in a four-color halftone printing process.

It should be appreciated that, while the above-outlined method has been described in terms of finding solutions to equations (5a)–(5d), which describe equations containing components corresponding to four-separation colors, such as, for example, cyan, magenta, black, and yellow it should be apparent that equations (5a)–(5d) can be also used for any other color combinations. Further, equations (5a)–(5d) can be expanded or reduced to include greater or lesser number of separation colors, as desired. Accordingly, combinations of more than or less than four non-orthogonal halftone cluster cells can be found in step S130 without departing from the spirit and scope of the invention. It is apparent that the above process may be readily implemented in software that can be used in a variety of hardware systems.

Figure 7:
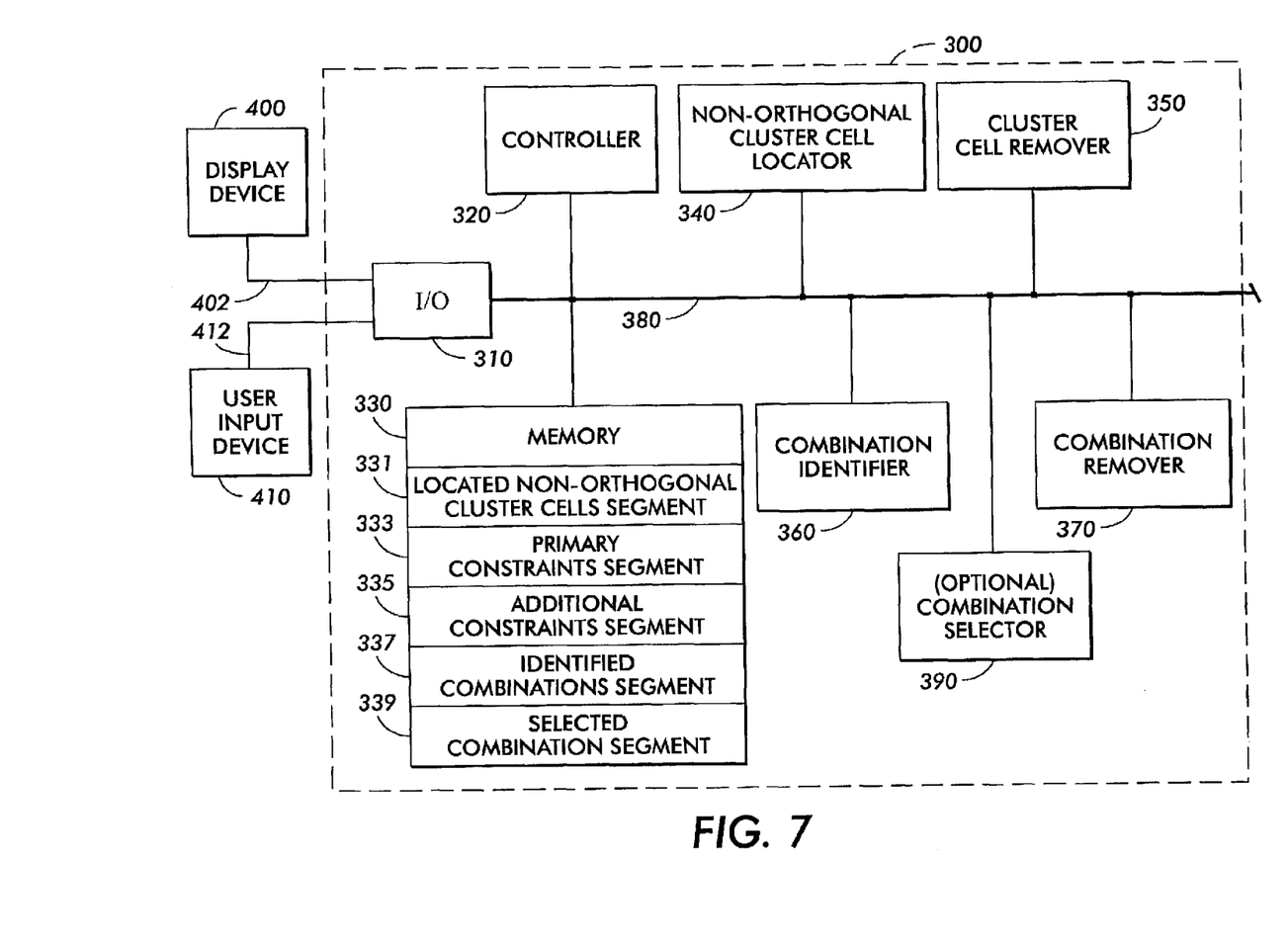
FIG. 7 is a block diagram of a system usable to generate a combination of non-orthogonal single-cell halftone screens for substantially moiré-free color printing in accordance with this invention.

FIG. 7 illustrates an exemplary embodiment of a substantially moiré-free non-orthogonal halftone cluster screen generating system 300 according to this invention. As shown in FIG. 7, the substantially moiré-free non-orthogonal halftone cluster screen generating system 300 contains an input/output interface 310, a controller 320, a memory 330, a non-orthogonal cluster cell locator circuit, routine or agent 340, a cluster cell remover circuit, routine or agent 350, a combination identifier circuit, routine or agent 360, a combination remover circuit, routine or agent 370, and a control/data bus 380. The input/output interface 310 is connected to one or more display devices 410 and/or to one or more input devices 400.

The controller 320 may coordinate, individually or in the aggregate, other devices, shown or not shown, connected to the control/data bus 380. The control/data bus 380 may be any form of a communication bus, wired or wireless. It should be appreciated that the substantially moiré-free non-orthogonal halftone cluster screen generating system 300 may be implemented by one or more general or special purpose computers, programmed microprocessors or microcontrollers and peripheral integrated circuit elements, ASICS or other logic circuits such as discrete element circuits, programmable logic devices such as PLD, PLA, FPGA or the like. In general, any finite state machine that is capable of implementing the flowchart of FIG. 5 can be used to implement the substantially moiré-free halftone cluster generating system 300 according to this invention.

The memory 330 includes one or more of a located non-orthogonal cluster cell memory segment 331, a primary constraints memory segment 333, an additional constraints memory segment 335, an identified combinations memory segment 337, and a selected combinations memory segment 339. The memory 330 may additionally contain other segments for related or other purposes, as desired.

While the memory 330 is illustrated in FIG. 7 as being separate from the controller 320, it is apparent to one of ordinary skill that the memory 330 could be incorporated into the controller 320 to form a single device, for example, on-chip RAM, without departing from the spirit or scope of this invention. Similarly, each of the devices in the substantially moiré-free non-orthogonal halftone cluster screen generating system 300 may contain its own individual memory or controller.

In various exemplary embodiments, the non-orthogonal cluster cell locator circuit, routine or agent 330 searches and locates non-orthogonal cluster cells according to equations (5a)–(5d). In various exemplary embodiments, the non-orthogonal cluster cell locator circuit, routine or agent 340 stores the located non-orthogonal cluster cells in the located non-orthogonal cluster cells segment 331 under control of the controller 320. The cluster cell remover circuit, routine or agent 350 removes cluster cells located by the non-orthogonal cluster cell locator 340 from the cluster cells stored in the located non-orthogonal cluster cells segment 331 based on the primary constraints stored in the primary constraints segment 333.

Alternatively, in various other exemplary embodiments, the non-orthogonal cluster cell locator circuit, routine or agent 340 supplies the located non-orthogonal cluster cells, whether under control of the controller 320 or not, directly to the cluster cell remover circuit, routine or agent 350. In this case, the cluster cell remover, routine or agent 350 determines which located non-orthogonal cluster cells satisfy the primary constraints stored in the primary constraints segment 333. Then, under control of the controller 320, the cluster cell remover circuit, routine or agent 350 either stores those located non-orthogonal cluster cells that meet the primary constraints stored in the located non-orthogonal cluster cells segment 331 or supplies them directly to the combination identifier circuit, routine or agent 360.

The combination identifier circuit, routine, or agent 360, under control of the controller 320, identifies combinations of located cluster cells that satisfy the moiré-free conditions described herein. For example, in various exemplary embodiments, the combination identifier circuit, routine or agent 360 identifies those combinations that satisfy equations (5a)–(5d). The identified combinations may be determined according to the different color separations of the halftone screens. In various other exemplary embodiments, the combination identifier circuit, routine or agent 360 stores the identified combinations of the remaining located non-orthogonal cluster cells in the identified combinations segment 337, under control of the controller 320. The combination remover circuit, routine or agent 370, under control of the controller 320, removes certain combinations that do not satisfy the additional constraints, if any, that may be stored in the additional constraints segment 335.

Alternatively, in various other exemplary embodiments, if any additional constraints are provided by the user, the combination identifier circuit, routine or agent 360 directly supplies the identified combinations to the combination remover circuit, routine or agent 370.

In this case, if additional constraints are provided, the combination remover circuit, routine or agent 370 determines which identified combinations satisfy the additional constraints. Then, under control of the controller 320, the combination remover circuit, routine or agent 370 either stores the remaining identified combinations that meet the additional constraints stored in the identified combinations segment 337, or provides the remaining identified combinations to the user, or, if provided, to the combination selector circuit, routine or agent 390.

The identified combinations stored in the identified combinations segment 337 are then provided to the user to allow the user to select one of the identified combinations to be used to generate substantially moiré-free halftone images. Alternatively, in other various exemplary embodiments where the combination selector circuit, routine or agent 390 is implemented, the identified combinations are provided to the combination selector circuit, routine or agent 390, which selects one of the identified combinations to be used to generate substantially moiré-free halftone images. In either case, the selected combination is then stored in the selected combinations segment 339.

It should be further appreciated that any of the elements 310–390 of the substantially moiré-free non-orthogonal halftone cluster screen generating system 300 may access data and/or signals input from the one or more input devices 410 through the input/output interface 310. Similarly, any of the elements 310–390 of the substantially moiré-free non-orthogonal halftone cluster screen generating system 300 may output data and/or signals to the display device 400.

As shown in FIG. 7, the image display device 400 and the user input device 410 are connected over links 402 and 412, respectively, to the input/output interface 310 which is connected to the moiré-free non-orthogonal halftone cluster screen generating system 300 via the control/data bus 380. The links 402 and 412 may be any known or later developed system or devices for transmitting an electronic image or electronic information/data to and from the display device 400 to the input/output interface 310, or to and from the user input device to the input/output interface 310. The image display device 400 displays electronic image data generated by or for the moiré-free non-orthogonal halftone cluster screen generating system 300. The one or more user input devices 410 control the electronic image generated by the display device 400 and/or control the operation of the moiré-free non-orthogonal halftone cluster screen generating system 300. The image display device 400 and/or user input device 410 can be integrated with the moiré-free non-orthogonal halftone cluster screen generating system 300.

It should be appreciated that the above-outlined exemplary procedures can be modified with many different alternatives or variations as apparent to those skilled in the art. For example, other constraints in addition to cell size may be used. Likewise, the solution sets may be sorted or further constrained according to size, positioning, angles, hardware characteristics, or the like.

It should be appreciated that, while the exemplary embodiments of this invention include various primary and additional constraints, it should be apparent that the primary and/or the additional constraints may include the null set. That is, various exemplary embodiments of this invention may identify and/or select combinations of non-orthogonal cluster cells or line screens without applying any primary constraints and/or additional constraints, as desired.

Figure 8:
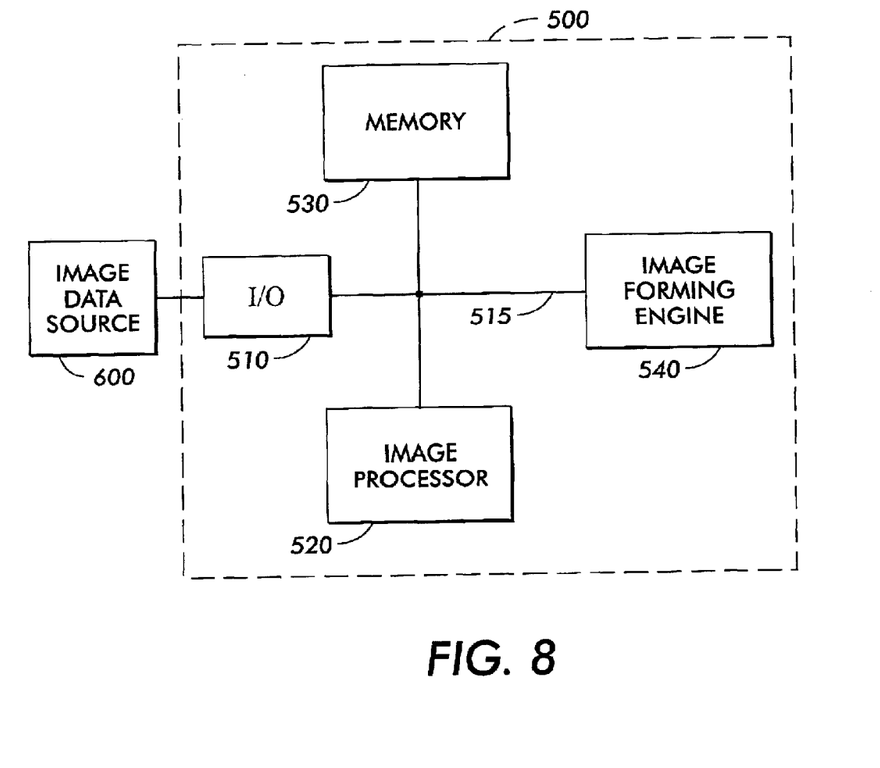
FIG. 8 is a block diagram of an exemplary halftone printing system that uses an exemplary embodiment of a combination of halftone screens according to this invention to form a substantially moiré-free halftone image.

FIG. 8 is a block diagram of one exemplary embodiment of a color halftoning printing system 500 suitable for halftoning images using the substantially moiré-free non-orthogonal cluster screens or combined substantially moiré-free non-orthogonal clusters and substantially moiré-free line screens according to this invention. The color halftoned image printing system 500 contains an input/output interface 510, an image processor 520, a memory 530, and an image forming engine 540, each connected to a control/data bus 515. Image data containing at least one continuous tone region and received from an image data source 600 is transferred to the memory 530 via the input/output interface 510 under the direction of the image processor 520.

The image processor 520 uses the selected non-orthogonal cluster for the different color separations, selected according to one of the exemplary embodiments outlined above, to convert the continuous tone image data received from the image data source 600 to binary raster data. The image processor 520 uses the memory 530 to store the image data and/or instructions for processing the image data. After using the selected non-orthogonal to convert at least the continuous tone portions of the image data to halftoned raster data, the image processor 520, via the control/data bus 515, sends control and raster data signals to the image forming engine 540 to print a halftone version of the image data received from the image data source 600. Because the image processor 520 used the non-orthogonal halftone screens selected according to this invention to generate the halftoned raster data, the resulting halftone image is substantially moiré-free. The image forming engine 540 may be a laser or ink-jet printer, a digital copier, a facsimile device, a computer with a built-in printer, or any other device that is capable of producing a hard copy image output based on halftone raster data.

It should be appreciated that the image processor 520 may be one or more general or special purpose computers, programmed microprocessors or microcontrollers and peripheral integrated circuit elements, ASIC or other logic circuits such as discrete element circuits, programmable logic devices such as PLD, PLA, FPGA or the like.

It should be also appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 600 is thus any known or later developed system or device for generating, storing and/or transmitting the electronic image data to the color halftoning printing system 500.

While the color halftoning printing system 500 shown in FIG. 8 contains several distinct components, it should be appreciated that each of these components may be combined in a device or system that performs all the functions of the individual components. Similarly, it is appreciated that the color halftoning printing system 500 may contain less than all the components illustrated in FIG. 8 without departing from the spirit and scope of this invention. For example, a color halftoning printing system may also contain a monitor, if desired. Also, the image processor 520 may possess supporting hardware or devices such as additional memory, a communication path, I/O devices, etc., without departing from the spirit and scope of this invention. Accordingly, the systems and methods according to this invention allow more degrees of freedom for moiré-free color halftoning than were previously available when selecting the cluster and/or line screens to be used when halftoning the various color separations.

Though the above exemplary procedures describe solution sets according to the moiré-free equations described above, it is apparent that equally desirable solution sets can be found by replacing the right hand side of the moiré-free equations with an arbitrarily small number or by suitably altering the quantity or expression of the parameters of the moiré-free equations without departing from the spirit and scope of this invention. Further, while the exemplary embodiments describe solutions for the color separations of cyan, magenta, and black, other colors or combinations of colors, as desired, can be substituted. Also, more or less than three color separations can be utilized as desired.

Further, while the exemplary embodiments refer to solution sets as principally containing non-orthogonal, parallelogram-shaped cluster cells, it should be appreciated that the exemplary embodiments according to this invention can also be applied to non-parallelogram shaped dots. For example, squares, rectangles, triangles, ellipses, oblate or prolate shapes, trapezoidal shapes or the like, where the outer boundary of the respective shape is substantially contained within the angles formed by the representative halftone cell vectors, can be used. Therefore, it should be appreciated that various exemplary embodiments of this invention can suitably generate and/or use combinations of various at least substantially moiré-free cluster cells whose halftone dot boundaries can be substantially defined by the respective spatial or frequency domain vectors. It is evident that many alternatives, modifications, or variations of the cell types and procedures for combining various cell types for satisfying the moiré-free conditions are apparent to those skilled in the art. Accordingly, various changes may be made without departing from the spirit and scope of the invention.

What is claimed is:

1. A method of generating a plurality of non-orthogonal halftone screens for substantially moiré-free four-color halftoning, comprising:

locating non-orthogonal halftone cells suitable for tiling an image plane that are substantially specified by two frequency vectors $F_{n_1}=(fx_{n_1}, fy_{n_1})$ and $F_{n_2}=(fx_{n_2}, fy_{n_2})$, where n=color indices a, b, c, d of four different colors;

identifying combinations of four of the non-orthogonal halftone cells which simultaneously satisfy:

$F_{a_1}+F_{b_1}+F_{c_1}=0$, and $F_{a_2}+F_{b_2}+F_{c_2}=0$ and $F_{a_1}+F_{b_2}+F_{d_1}=0$, and $F_{a_2}+F_{b_1}+F_{d_2}=0$ where, $F_{d_1} \neq F_{c_1}$, $F_{d_1} \neq F_{c_2}$, $F_{d_2} \neq F_{c_1}$, and $F_{d_2} \neq F_{c_2}$, and $|F_{n_x} \pm F_{m_y}| > M$ where, M=minimum acceptable two-color moiré frequency
n=a, b, c, d
m=a, b, c, d
n≠m
x=1, 2,
y=1, 2;

selecting one of the identified combinations of four non-orthogonal halftone cells; and associating each non-orthogonal halftone cell of the selected identified combination with one or more color separations of a color halftone printer.

2. The method defined in claim 1 further comprising:

identifying combinations of any three of the located non-orthogonal halftone cells prior to the step of identifying combinations of four of the non-orthogonal halftone cells, where the frequency vectors of the identified combinations satisfy:

$F_{n_1}+F_{m_1}+F_{P_2}=0$, and $F_{n_2}+F_{m_2}+F_{P_2}=0$ where,
n=a, b, c, d
m=a, b, c, d
p=a, b, c, d
a, b, c, d are color indices of four different colors
n≠m≠p, and $|F_{n_x} \pm F_{m_y}| > M$ where, M=minimum acceptable two-color moiré frequency
x=1, 2
y=1, 2.

3. The method defined in claim 1 wherein the two frequency vectors specifying each non-orthogonal halftone cell satisfy:

$|F_{n_1} \pm F_{n_2}| > |F_{n_1}|$ and $|F_{n_2} \pm F_{n_2}| > |F_{n_2}|$.

4. The method defined in claim 1, wherein non-orthogonal halftone cells include cell shapes containing right angles.

5. The method defined in claim 1, further comprising:

applying constraints to the located non-orthogonal halftone cells; and removing non-orthogonal halftone cells that do not satisfy the constraints from the located non-orthogonal halftone cells.

6. The method defined in claim 5, further comprising:

applying constraints to the identified combinations of non-orthogonal halftone cells; and removing combinations of non-orthogonal halftone cells that do not satisfy the constraints from the identified combinations of non-orthogonal halftone cells.

7. The method defined in claim 1, further comprising:

applying constraints to the identified combinations of non-orthogonal halftone cells; and removing combinations of non-orthogonal halftone cells that do not satisfy the constraints from the identified combinations of non-orthogonal halftone cells.

8. An apparatus for generating non-orthogonal halftone screens for substantially moiré-free four-color halftoning, comprising:

a non-orthogonal halftone cell locating circuit, routine or agent that locates substantially non-orthogonal halftone cells suitable for tiling an image plane that are substantially specified by two frequency vectors $F_{n_1}=(fx_{n_1}, fy_{n_1})$ and $F_{n_2}=(fx_{n_2}, fy_{n_2})$ where n=color indices a, b, c, d of four different colors;

a first non-orthogonal halftone cell combination identifying circuit, routine or agent that identifies combinations of four of the located non-orthogonal halftone cells which simultaneously satisfy:

$F_{a_1}+F_{b_1}+F_{c_1}=0$, and $F_{a_2}+F_{b_2}+F_{c_2}=0$ and $F_{n_1}+F_{b_2}+F_{d_1}=0$, and $F_{a_2}+F_{b_1}+F_{d_2}=0$ where, $F_{d_1} \neq F_{c_1}$, $F_{d_1} \neq F_{c_2}$, $F_{d_2} \neq F_{c_1}$, and $F_{d_2} \neq F_{c_2}$, and $|F_{n_x} \pm F_{m_y}| > M$ where, M=minimum acceptable two-color moiré frequency
n=a, b, c, d
m=a, b, c, d
n≠m
x=1, 2
y=1, 2; and a non-orthogonal halftone cell selector circuit, routine or agent that selects one of the identified combinations of four halftone cells and associates each of the selected cells with a color separation of a color halftone printer.

9. The apparatus defined in claim 8 further comprising:
a second non-orthogonal halftone cell combination identifying circuit, routine or agent that identifies combinations of three of the located non-orthogonal halftone cells and provides them to said first non-orthogonal halftone cell combination identifying circuit, routine or agent, wherein the frequency vectors of the identified combinations of three non-orthogonal halftone cells satisfy:

$$F_{n_1}+F_{m_1}+F_{p_1}=0, \text{ and}$$

$$F_{n_2}+F_{m_2}+F_{p_2}=0$$

where,
n=a, b, c, d
m=a, b, c, d
p=a, b, c, d
a, b, c, d are color indices of four different colors
n≠m≠p, and $$|F_{n_x} \pm F_{m_y}| > M$$

where,
M=minimum acceptable two-color moiré frequency
x=1, 2
y=1, 2.

10. The apparatus defined in claim 8 wherein the two frequency vectors specifying each non-orthogonal halftone cell satisfy:

$$|F_{n_1} \pm F_{n_2}| > |F_{n_1}| \text{ and}$$

$$|F_{n_1} \pm F_{n_1}| > |F_{n_2}|.$$

11. The apparatus defined in claim 8, wherein non-orthogonal halftone cells include cell shapes containing right angles.

12. The apparatus defined in claim 8, further comprising:
a located non-orthogonal halftone cell removing circuit, routing or agent that removes located non-orthogonal cells according to a set of locating constraints.

13. The apparatus defined in claim 12, further comprising:
a non-orthogonal halftone cell combination removing circuit, routine or agent that removes non-orthogonal halftone cell combinations according to a set of combination removing constraints.

14. The apparatus defined in claim 8, further comprising:
a non-orthogonal halftone cell combination removing circuit, routine or agent that removes non-orthogonal halftone cell combinations according to a set of combination removing constraints.

15. A method for using a plurality of non-orthogonal halftone screens for substantially moiré-free color halftoning, comprising:
inputting an image data;
converting the image data to a halftone image data;
locating a plurality of tileable halftone screens that contain combinations of non-orthogonal halftone cells where each non-orthogonal halftone cell is substantially specified by two frequency vectors $F_{n_1}=(fx_{n_1}, fy_{n_1})$ and $F_{n_2}=(fx_{n_2}, fy_{n_2})$, where n=color indices a, b, c, d of four different colors;
identifying combinations of four of the non-orthogonal halftone cells which simultaneously satisfy:

$$F_{a_1}+F_{b_1}+F_{c_1}=0, \text{ and}$$

$$F_{a_2}+F_{b_2}+F_{c_2}=0$$

and $$F_{a_1}+F_{b_2}+F_{d_1}=0, \text{ and}$$

$$F_{a_2}+F_{b_1}+F_{d_2}=0$$

where,
$F_{d_1} \neq F_{c_1}$, $F_{d_1} \neq F_{c_2}$, $F_{d_2} \neq F_{c_1}$, and $F_{d_2} \neq F_{c_2}$, and $$|F_{n_x} \pm F_{m_y}| > M$$

where,
M=minimum acceptable two-color moiré frequency
n=a, b, c, d
m=a, b, c, d
n≠m
x=1, 2
y=1, 2; and
forming an image on an image recording medium using the halftone image data.

16. The method defined in claim 15, wherein non-orthogonal halftone cells include cell shapes containing right angles.

17. The method defined in claim 15, further comprising:
applying constraints to the located non-orthogonal halftone cells; and
removing non-orthogonal halftone cells that do not satisfy the constraints from the located non-orthogonal halftone cells.

18. The method defined in claim 17 further comprising:
applying constraints to the identified combinations of non-orthogonal halftone cells; and
removing combinations of non-orthogonal halftone cells that do not satisfy the constraints from the identified combinations of non-orthogonal halftone cells.

* * * * *